United States Patent
Kennedy et al.

[11] Patent Number: 6,130,291
[45] Date of Patent: Oct. 10, 2000

[54] DYNAMIC STAR POLYMERS AND A METHOD FOR THE SYNTHESIS THEREOF

[75] Inventors: Joseph P. Kennedy, Akron, Ohio; Miklós Zsuga, Debrecen, Hungary; Sándor Kéki, Debrecen, Hungary; György Deák, Debrecen, Hungary

[73] Assignee: The University of Akron, Akron, Ohio

[21] Appl. No.: 09/090,443

[22] Filed: Jun. 4, 1998

[51] Int. Cl.$^7$ .............. C08L 47/00; C08L 53/00
[52] U.S. Cl. .............. 525/98; 525/244; 525/314; 525/315; 525/316; 528/495
[58] Field of Search .............. 525/98, 244, 314, 525/315, 316; 528/495

[56] References Cited

U.S. PATENT DOCUMENTS

| | | | |
|---|---|---|---|
| 4,910,321 | 3/1990 | Kennedy et al. | 549/213 |
| 4,946,899 | 8/1990 | Kennedy et al. | 525/244 |
| 5,122,572 | 6/1992 | Kennedy et al. | 525/314 |
| 5,395,885 | 3/1995 | Kennedy et al. | 525/98 |
| 5,428,111 | 6/1995 | Faust et al. | 525/314 |

OTHER PUBLICATIONS

International Symposium on Ionic Polymerization, Paris, Jul. 1997.

*Primary Examiner*—Duc Truong
*Attorney, Agent, or Firm*—Renner, Kenner, Greive, Bobak, Taylor & Weber

[57] ABSTRACT

A dynamic star polymer contains a plurality of at least three substantially identical block copolymers, each block copolymer including an aromatic polymer moiety having a glass transition temperature of at least about 95° C., and an aliphatic polymer moiety incompatible with the aromatic polymer moiety. The aromatic moieties of each of the formed block copolymers aggregate to form a chemically uncrosslinked core, while the aliphatic polymer moieties radiate outwardly from the core. The multi-arm star polymer is uniquely capable of changing its molecular structure under external influences, and the core thereof preferably exhibits thermoplastic characteristics.

25 Claims, 1 Drawing Sheet

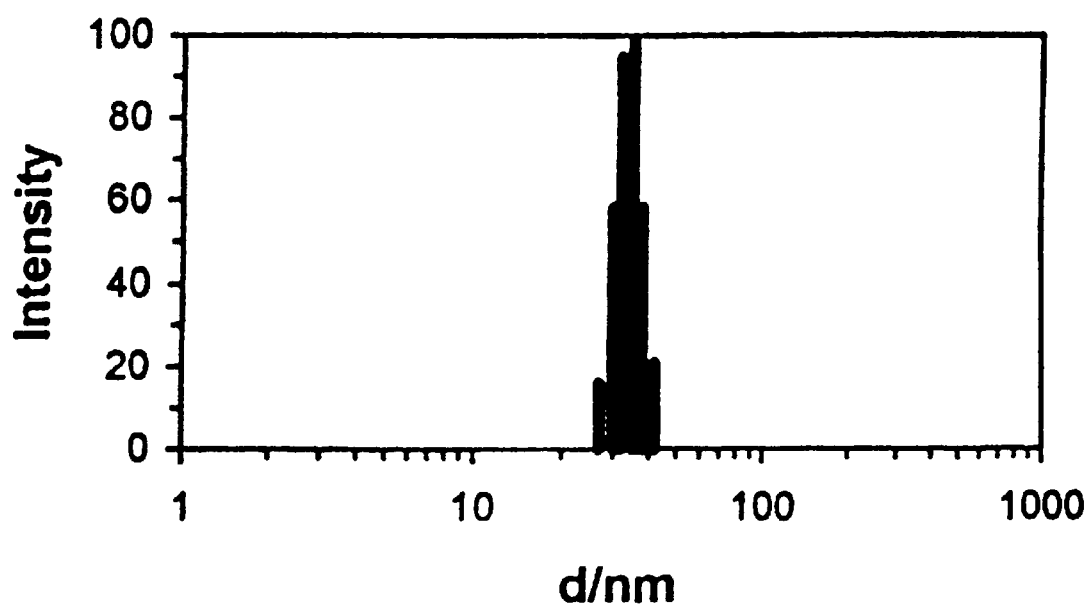

6,130,291

DYNAMIC STAR POLYMERS AND A METHOD FOR THE SYNTHESIS THEREOF

The research disclosed in this application was at least partially supported by the National Science Foundation under Grant DMR-94-23202, and the United States government may have certain rights herein.

TECHNICAL FIELD

This invention relates generally to a multi-arm star polymer capable of changing its molecular structure under external influences. More particularly, the present invention relates to a dynamic star polymer having a plurality of aliphatic polymer arms emanating from a chemically uncrosslinked, aromatic polymer core, which core is incompatible with the aliphatic polymer arms and preferably exhibits thermoplastic characteristics. Specifically, the invention relates to a star polymer having a plurality of polyisobutylene arms and a core comprising a plurality of chemically uncrosslinked, aromatic, preferably styrenic, polymers having a high glass transition temperature (Tg), which core is incompatible with the polyisobutylene arms, and flows when heated above its glass transition temperature. A method for synthesizing the novel star polymer is also disclosed.

BACKGROUND

It is well known that star polymers containing polyisobutylene arms of practically any length, and thus, with controlled molecular weight, can be synthesized by living cationic polymerization. Such star polymers are gradually gaining acceptance and may have potential application in the motor oil industry as motor oil additives and viscosity index improvers, to the extent that they are known to decrease the viscosity of lubricating oils over a wide temperature range.

A number of patents have been obtained relating to star polymers, generally on the basis of providing a different, chemically crosslinked core from which the polyisobutylene arms emanate. For example, one of the first synthesis of a star polymer containing carbocationically polymerized polyisobutylene arms emanating from a crosslinked core is described in Kennedy et al. U.S. Pat. No. 10 5,395,885. There, excess divinylbenzene was used as a linking reagent to a living polyisobutylene charge by the "arm first" method. The resultant star polymer had a plurality of polyisobutylene arms emanating from a polydivinylbenzene (PDVB) core. The core, however, was ill-defined to the extent that its structure was not readily characterizable or controllable, due mainly to the presence of some double bonds in the core itself.

Consequently, other star polymers were synthesized having well-defined, chemically crosslinked cores which did not have any such undesirable double bonds. For example, Kennedy et al. U.S. Pat. No. 5,663,245 describes a star polymer having a plurality of polyisobutylene arms emanating from a siloxane core, while Majoros et al. U.S. Pat. No. 5,840,814 discloses a star polymer having a plurality of polyisobutylene arms emanating from a calixarene core.

Although the star polymers discussed hereinabove appear to demonstrate a high degree of resistance to decomposition, these star polymers, nevertheless, ultimately will decompose upon exposure to high heat or high stress external environments. This is because all of the previously synthesized star polymers have chemically crosslinked cores which were incapable of molecular shape change upon exposure to heat or other external influences. That is, all of the cores of the previous star polymers are "static" rather than "dynamic". Since all of the described star polymers have crosslinked, i.e., chemically bonded, cores, they necessarily lack an advantageous viscosity property desirable in lubricant additives, i.e., the ability to change molecular structure upon exposure to heat or other external influences, and then return to their original state upon the return of previous conditions.

In order to effectively change molecular structure, it will be appreciated that the "core" of the star polymer must have segments which can separate upon changes in external conditions. Just as important, the process must be reversible, meaning the core segments can relink upon a return of prior conditions.

The synthesis of block copolymers by living carbocationic polymerization of monomers such as isobutylene and an aromatic, preferably styrenic, monomer is also known in the art and has been described in at least Faust et al. U.S. Pat. No. 5,428,111. A more detailed discussion relating to the living carbocationic polymerization of polyisobutylene and block copolymers, particularly diblocks, can be found generally in Kennedy, J. P. and B. Ivan, *Designed Polymers by Carbocationic Macromolecular Engineering: Theory and Practice*, Hanser Publishers, New York, N.Y., (1992), the disclosure of which is incorporated herein by reference. Such block polymers and copolymers containing polyisobutylene have also been used as the "arms" of a number of star block polymers including those star block polymers having polyisobutylene-b-styrene block polymer arms emanating from a calixarene core as described in Marjoros et al. U.S. Pat. No. 5,840,814. However, in each instance, a crosslinked core, i.e., a chemically bonded core, has been a necessary part of the star polymer composition. Such a chemically crosslinked core is not suitably dynamic in character so as to change molecular shape upon exposure to external influences such as heat.

As such, there exists a need for a star polymer with a chemically uncrosslinked core which will not decompose, but rather will undergo molecular shape change at high temperatures, and a method for the synthesis of such a star polymer.

SUMMARY OF THE INVENTION

It is, therefore, an object of the present invention to provide a novel dynamic star polymer.

It is another object of the present invention to provide a star polymer, as above, having a plurality of aliphatic polymer arms and an incompatible, chemically uncrosslinked, aromatic polymer core.

It is still another object of the present invention to provide a star polymer, as above, that has the ability to change its molecular shape under external influences, such as, for example, exposure to high temperatures, but can return to its original structure upon the return of previous conditions.

It is a further object of the present invention to provide a method for the synthesis of a novel dynamic star polymer.

It is still a further object of the present invention to provide a method for the synthesis of a star polymer, as above, having multiple, aliphatic polymer arms emanating from an incompatible aromatic polymer core which exhibits thermoplastic characteristics.

It is yet a further object of the present invention to provide a method for the synthesis of a star polymer, as above, from polyisobutylene-polystyrene diblocks by sequential living cationic block copolymerization of isobutylene and styrene monomers.

It is yet another object of the present invention to provide a method for the synthesis of a dynamic star polymer from polyisobutylene-polystyrene-polyisobutylene triblocks or polyisobutylene-polystyrene diblocks.

These and other objects of the present invention, as well as the advantages thereof over the known art relating to star polymers, which shall become apparent from the description to follow, are accomplished by the invention hereinafter described and claimed.

In general, the present invention provides a star polymer comprising a plurality of at least three substantially identical block copolymers, each block copolymer including a first moiety selected from the group consisting of aromatic polymers having a glass transition temperature of at least about 95° C., and a second moiety selected from the group consisting of aliphatic polymers that are incompatible with the first moiety. The first moieties of the block copolymers aggregate to form a chemically uncrosslinked core, and the second moieties radiate outwardly from the core to form the arms of the star polymer.

Other objects of the present invention may be achieved by a star polymer comprising a plurality of at least two substantially identical tri-block copolymers, each tri-block copolymer including a first, mid-block moiety selected from the group consisting of aromatic polymers having a glass transition temperature of at least about 95° C., and second and third end-block moieties selected from the group consisting of aliphatic polymers that are incompatible with the first moiety, the second and third moieties being substantially identical to each other. The first moieties of the tri-block copolymers aggregate to form a chemically uncrosslinked core, and the second and third moieties radiate outwardly from the core to define the arms of the star polymer.

The present invention further provides a method for synthesizing a star polymer having a plurality of at least three arms containing an aliphatic polymer emanating from a chemically uncrosslinked core containing a plurality of at least two substantially identical aromatic polymers having a glass transition temperature of at least about 95° C. and being incompatible with the aliphatic polymer arms. The method includes the step of effecting sequential living cationic block copolymerization of the aromatic polymers and the aliphatic polymers at a temperature below the glass transition temperature of the aromatic polymers such that the aromatic polymers have an affinity for one another and aggregate to form the core.

For a complete understanding of the objects, techniques, structure of and characterization of the invention, reference should be made to the following detailed description of a preferred embodiment and the accompanying drawing which have been set forth for purposes of illustrating the best mode for the invention known at the time. While the invention may take physical form in certain parts and/or arrangement of parts, it is not necessarily limited to the preferred embodiment disclosed and described, the invention being measured by the scope and spirit of the claims. Furthermore, all examples set forth hereinbelow are illustrative only and are not meant to limit the invention.

BRIEF DESCRIPTION OF THE DRAWINGS

The drawing is a representative trace of the intensity or distribution of micelles, with respect to size (in nm), formed from polyisobutylene-b-polystyrene-b-polyisobutylene tri-blocks in hexane obtained at 60° C. as determined by dynamic light scattering (DLS). The length of the polystyrene segments and the polyisobutylene segments are 7000 and 10,000 grams/mole, respectively.

PREFERRED EMBODIMENT FOR CARRYING OUT THE INVENTION

Broadly, the present invention is directed toward the synthesis of a novel composition of matter comprising a plurality of substantially identical block copolymers having at least two distinct segments or moieties, one segment being incompatible with the other. By the term "substantially identical," it is meant that each block copolymer of the plurality has the same distinct segments or moieties provided in the same particular arrangement within the copolymer, but that each segment's chain length and, therefore, its molecular weight, may be different depending upon the polymerization conditions under which the particular segment was prepared. By the term "incompatible" it is meant that the two segments are not compatible with each other as defined in Chapter 11 of Legge, N. R. et al. (eds.). *Thermoplastic Elastomers A Comprehensive Review*, Hanser Publications, New York, N.Y. (1987), the disclosure of which incorporated by reference. More particularly, the present invention is derived from the phenomenon that one of the segments, polymerized from an aromatic, preferably styrenic, monomer, tends to have an affinity for segments like itself while being incompatible with the other segment (s) such that these like segments aggregate together while the other segments of the plurality of block copolymers, polymerized from an aliphatic, preferably isobutylene, monomer, tend to radiate outwardly from the aggregation in a manner reminiscent of a star-like structure. Thus, it will be appreciated that, for purposes of this invention, the term "star polymer" will be used to describe these compositions of matter, with the aggregation of the aromatic polymers forming the "core" of the star polymer, and each aliphatic polymer forming an "arm" of the star polymer.

Importantly, the aggregation of the aromatic polymer moieties or segments form a glassy core or central region which is not chemically crosslinked, thereby distinguishing this type of star polymer from previously developed star polymers described hereinabove. These aromatic polymer moieties also preferably exhibit thermoplastic characteristics, and thereby allow for the changing of the molecular shape of the resultant molecule, which property may be advantageous in lubricant additive applications. Further to that end, it will be appreciated that the aromatic, preferably styrenic, polymer moieties are preferably insoluble in aliphatic or naphthenic solvents such as hexane (a model solvent for aliphatic oils), while the rubbery aliphatic (preferably polyisobutylene) polymer moieties are preferably soluble in those same solvents.

Aromatic polymers suitable for use in the "core" of the star polymer include those having a glass transition temperature (Tg) of at least about 95° C. and, more preferably, from about 100° C. to about 300° C. It will be appreciated that the glass transition temperature of these polymers are well above those of the aliphatic polymers employed and is above the polymerization temperature at which the resultant block copolymers will be polymerized.

Particularly preferred are those aromatic polymers formed from styrenic monomers. These include polystyrene or any known cationally polymerizable derivative of polystyrene. In some cases, fullerene may be employed as the "core" aromatic polymer. Examples of aromatic (styrenic) polymers particularly suitable for use in the present invention include those selected from the group consisting of polystyrene (having a Tg of about 100° C.), poly(a-methylstyrene) (having a Tg of about 170° C.), poly(p-methylstyrene) (having a Tg of about 108° C.), poly(p-chlorostyrene) (having a Tg of about 127° C.), polyidene (having a Tg of about 180° C.), polyacenaphtylene (having a Tg of about 250° C. to about 300° C.) and similar polyaromatic compounds.

The preferred aliphatic polymers employed as the arms of the star polymer include polyisoolefins, and more preferably, polyisobutylene. It will be appreciated that polyisobutylene has a glass transition temperature of about −70° C., and the polymer is not compatible with polystyrene or its derivatives.

The star polymer is formed by first synthesizing a block copolymer comprising a first moiety containing an aromatic polymer, such as polystyrene and a second moiety containing an aliphatic polymer, such a polyisobutylene. This can be done by the living homopolymerzation of the aliphatic, e.g., isobutylene, monomer or aromatic, e.g., styrene, monomer and the sequential block copolymerization of the monomers.

In one preferred embodiment, the living polymerization of the styrene (or a derivative thereof) may be effected by any of a number of well known methods. For instance, the living polymerization of the styrene monomer can be achieved by an organic ester, ether or chloride/$TiCl_4$ or $BCl_3$ initiating system as set forth in Faust et al. U.S. Pat. No. 5,428,111, or using other $BCl_3$ and $TiCl_4$ initiator systems, particularly those methods conducted in the presence of a solvent such as hexane. A more detailed discussion as to the particular types of carbocationic polymerization systems suitable for the present invention is present in Kennedy, J. P. and B. Ivan, *Designed Polymers by Carbocationic Macromolecular Engineering: Theory and Practice*, Hanser Publishers, New York, N.Y., (1992), again incorporated herein by reference.

Once carbocationic polymerization of the styrene monomer (PSt) has reached a sufficiently desirable molecular weight, preferably between about 1,000 grams/mol and about 15,000 grams/mol, the aliphatic, isobutylene monomer is added to the living polystyrene cations. Subsequently, the polymerization of isobutylene commences and the reaction is allowed to proceed until the polyisobutylene moiety (PIB) reaches a preferred molecular weight of between about 1,000 grams/mol and 50,000 grams/mol, thereby forming a living block copolymer, PSt-b-PIB+.

Alternatively, it will be appreciated that living polymerization of the aliphatic monomer, preferably isobutylene, may be induced first, followed by the addition of the aromatic, preferably styrene, monomer upon polymerization of the aliphatic isobutylene monomer to its desired molecular weight. That is, for example, living polymerization of isobutylene may be induced by an initiator in conjunction with certain a Friedel-Crafts acids, (e.g., 2-chloro-2,4,4-trimethylpentane (TMPCl)/$BCl_3$ initiating system) preferably in the presence of a solvent to form living polyisobutylene cations. A styrene or derivative thereof may then be added as a second monomer, thereby forming the living block copolymer, PIB-b-PSt+.

In either event, the polymerization of the living block copolymers PSt-b-PIB+ or PIB-b-PSt+ is quenched by a suitable alcohol such as, for example, methanol, and the, in this instance, diblock copolymer is recovered using well known techniques. Generally, the recovery of the block copolymer includes precipitating the product in the methanol, and subsequently washing and drying the copolymer. Upon drying, the aromatic segments of the diblock copolymer aggregate, and the copolymers form micelles. That is, due to the incompatibility between the aliphatic, preferably PIB, moiety and the aromatic, preferably PSt, moiety, microphase separation between the two moieties will necessarily occur, resulting in a plurality of diblock copolymers having a particular structure or arrangement shown schematically for a plurality of polyisobutylene-b-polystyrene (PIB-PSt) copolyermers hereinbelow wherein the box-like segments represent the aromatic PSt moiety and the wiggly lines represent the aliphatic PIB moiety. The copolymerization is effected at a temperature below the glass transition temperature of the aromatic polymers such that the aromatic polymers have an affinity for one another and aggregate to form the core.

Scheme I

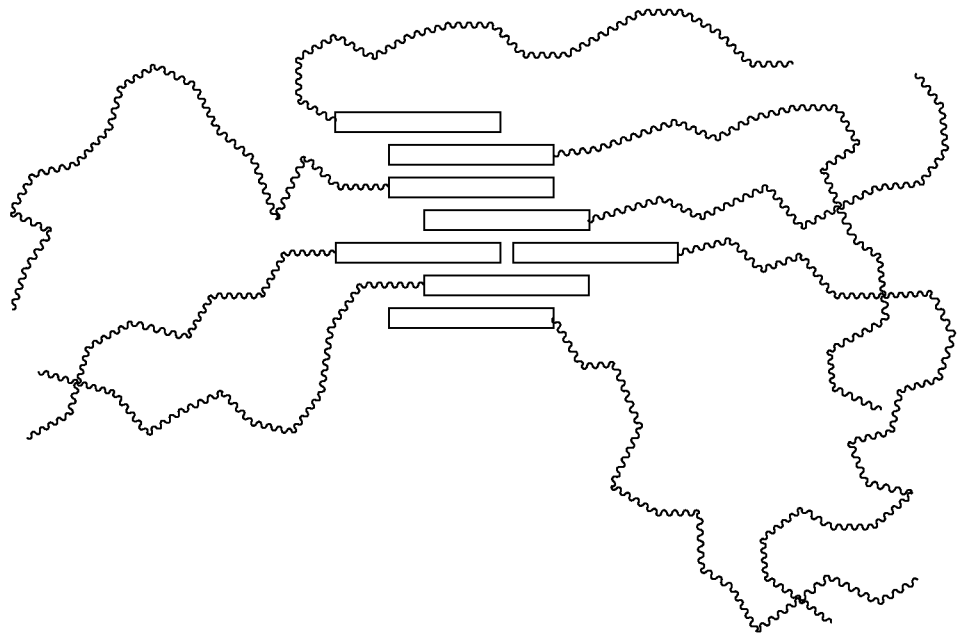

In another preferred embodiment, tri-block copolymers having a third moiety selected from the group consisting of aliphatic polymers that are incompatible with the aromatic moiety and substantially identical to the aliphatic moiety, can again be synthesized via sequential living cationic block polymerization at a temperature below the glass transition temperature of the aromatic polymers such that the aromatic polymers have an affinity for one another and aggregate to form the core. It will be appreciated that the aromatic polymer moiety will form the mid-block segment of the tri polymer, while the aliphatic polymers each form the end-blocks of the tri-block copolymer.

In this embodiment, living polymerization of an aliphatic (isobutylene) monomer commences, followed by the addition of the aromatic, preferably styrene, monomer upon polymerization of the aliphatic IB monomer to its desired molecular weight. Once the aromatic, preferably polystyrene, polymer has grown to its desired molecular weight, additional aliphatic IB monomer is then added again, thereby attaching to the living polystyrene cation, and forming the tri-block copolymer.

As with the diblock copolymers, polymerization of the living triblock copolymers is quenched by a suitable alcohol such as, for example, methanol, and the, in this instance, tri-block copolymers are recovered using well known techniques described hereinabove. Again, upon drying, the aromatic segments of the triblock copolymers aggregate, and the copolymers form micelles. A schematic structure of the micelles formed from the preferred PIB-PSt-PIB tri-block in hexane is shown hereinbelow. That part of the structure within the circle represents the polystyrene segments.

Scheme II

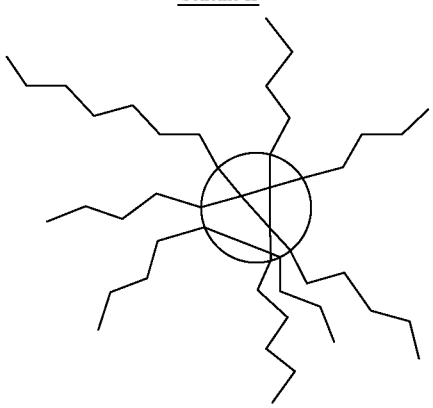

It will be appreciated that the star polymer of the present invention must necessarily have at least three arms emanating from a central "core" region. Therefore, where diblock copolymers such as are exemplified in Scheme I are employed, at least three substantially identical diblock copolymers will be employed. However, where tri-block copolymers such as are exemplified in Scheme II are employed, any two substantially identical tri-block copolymers will necessarily form four arms emanating from the core defined by the mid-block moieties.

In order to demonstrate practice of the invention, polyisobutylene-b-polystyrene-b-polyisobutylene (PIB-PSt-PIB) was synthesized by a 1,4-di(2-chloro-2-propyl)-benzene, (pDCC/BC13) initiating system, and polyisobutylene-b-polystyrene diblock was synthesized by a 2-chloro-2,4,4-trimethyl pentane (TMPCl)/BC13 initiating system. The lengths of the polystyrene and polyisobutylene segments were varied in the range of from about 5,000 g/mol to about 15,000 g/mol. Microphase separation was observed in hexane, in which the PIB segments were soluble while the PSt segments were not.

Formation of micelles were observed and investigated using dynamic light scattering (DLS) techniques in hexane. In particular, the size and the size distribution of micelles were investigated. To that end, the drawing figure shows a typical size distribution determined by dynamic light scattering of micelles from PIB-PSt-PIB triblock in hexane. On the basis of dynamic light scattering results, formation of spherical micelles can be concluded, and the length of the polystyrene and the polyisobutylene segments were found to be about 7000 g/mol and about 10000 g/mol, respectively.

Thus, it should be evident that the composition and methods of the present invention are highly effective in providing and synthesizing a dynamic star polymer having a plurality of aliphatic, preferably polyisobutylene, polymer arms emanating from a chemically uncrosslinked, aromatic, preferably styrenic, polymer core, which core is incompatible with the aliphatic polymer arms and preferably exhibits thermoplastic characteristics. The invention is particularly suited for use as a lubricant additive, but is not necessarily limited thereto.

Based upon the foregoing disclosure, it should now be apparent that the use of the dynamic star polymer described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, aromatic polymers according to the present invention are not necessarily limited to those of a styrenic nature. Moreover, aliphatic polymers according to the present invention are not necessarily limited to polyisobutylene. Thus, the scope of the invention shall include all modifications and variations that may fall within the scope of the attached claims.

What is claimed is:

1. A star polymer comprising:
a plurality of at least three substantially identical block copolymers, each block copolymer including a first moiety selected from the group consisting of aromatic polymers having a glass transition temperature of at least about 95° C., and a second moiety selected from the group consisting of aliphatic polymers that are incompatible with said first moiety;
wherein said first moieties of said block copolymers aggregate to form a chemically uncrosslinked core, and said second moieties radiate outwardly from said core.

2. The star polymer as set forth in claim 1, wherein said first moiety is selected from the group consisting of aromatic polymers having a glass transition temperature of between about 100° C. and 300° C.

3. The star polymer as set forth in claim 1, wherein said core exhibits thermoplastic characteristics.

4. The star polymer as set forth in claim 1, wherein said first moiety is selected from the group consisting of aromatic polymers that are insoluble in naphthenic solvent.

5. The star polymer as set forth in claim 1, wherein said second moiety is contains polyisobutylene.

6. The star polymer as set forth in claim 5, wherein said polyisobutylene has a molecular weight of from about 1,000 to about 50,000 g/mol.

7. The star polymer as set forth in claim 1, wherein said second moiety is selected from the group consisting of aliphatic polymers that are soluble in naphthenic solvent.

8. The star polymer as set forth in claim 1, wherein said first moiety is selected from the group consisting of polystyrene and the cationally polymerizable derivatives of polystyrene.

9. The star polymer as set forth in claim 1, wherein said first moiety is selected from the group consisting of polystyrene, poly(a-methylstyrene), poly(p-methylstyrene), poly(p-chlorostyrene), polyidene, polyacenaphtylene, and fullerene.

10. The star polymer as set forth in claim 8, wherein said first moiety contains a polystyrene having a molecular weight of from about 1,000 to about 15,000 g/mol.

11. The star polymer as set forth in claim 1, wherein said block copolymers are diblock copolymers.

12. The star polymer as set forth in claim 11, wherein said diblock copolymer is polystyrene-b-polyisobutylene.

13. The star polymer as set forth in claim 1, wherein said block copolymers are tri-block copolymers including a third moiety selected from the group consisting of aliphatic polymers that are incompatible with said first moiety and substantially identical to said second moiety, and wherein said first moiety form the mid-block and said second moiety and said third moiety form the end-blocks of said tri-block copolymer.

14. The star polymer as set forth in claim 13, wherein said tri-block copolymer is polyisobutylene-b-polystyrene-b-polyisobutylene.

15. A star polymer comprising:
a plurality of at least two substantially identical tri-block copolymers, each tri-block copolymer including a first, mid-block moiety selected from the group consisting of aromatic polymers having a glass transition temperature of at least about 95° C., and second and third end-block moieties selected from the group consisting of aliphatic polymers that are incompatible with said first moiety, said second and third moieties being substantially identical to each other;
wherein said first moieties of said tri-block copolymers aggregate to form a chemically uncrosslinked core, and said second and third moieties radiate outwardly from said core.

16. The star polymer as set forth in claim 15, wherein said tri-block copolymer is polyisobutylene-b-polystyrene-b-polyisobutylene.

17. A method for synthesizing a star polymer having a plurality of at least three arms containing an aliphatic polymer emanating from a chemically uncrosslinked core containing a plurality of at least two substantially identical aromatic polymers having a glass transition temperature of at least about 95° C. and being incompatible with said aliphatic polymer arms, comprising the step of:
effecting sequential living cationic block copolymerization of the aromatic polymers and the aliphatic polymers at a temperature below the glass transition temperature of the aromatic polymers such that the aromatic polymers have an affinity for one another and aggregate to form the core.

18. The method as set forth in claim 17, wherein the aromatic polymers include styrenic monomers and the aliphatic polymers include isobutylene monomers, and wherein the step of effecting sequential living cationic block copolymerization includes:
effecting living polymerization of the styrenic monomer to form living polystyrenic cations;
adding isobutylene monomer to said living polystyrenic cations and effecting living polymerization of said isobutylene monomer; and
quenching the block copolymerization of the styrenic monomer and isobutylene monomer by adding an alcohol.

19. The method as set forth in claim 17, wherein the aromatic polymers include styrenic monomers and the aliphatic polymers include isobutylene monomers, and wherein the step of effecting sequential living cationic block copolymerization includes:
effecting living polymerization of the isobutylene monomer to form living polyisobutylene cations;
adding styrenic monomer to said living polyisobutylene cations and effecting living polymerization of said styrenic monomer; and
quenching the block copolymerization of the isobutylene monomer and styrenic monomer by adding an alcohol.

20. The method as set forth in claim 18, wherein the step of effecting living polymerization of the styrenic monomer results in the production of a moiety selected from the group consisting of polystyrene and cationally polymerizable derivatives of polystyrene.

21. The method as set forth in claim 20, wherein said moiety is selected from the group consisting of polystyrene, poly(a-methylstyrene), poly(p-methylstyrene), poly(p-chlorostyrene), polyidene, and polyacenaphtylene.

22. The method as set forth in claim 19, wherein the step of effecting living polymerization of the styrenic monomer results in the production of a moiety selected from the group consisting of polystyrene and cationally polymerizable derivatives of polystyrene.

23. The method as set forth in claim 22, wherein said moiety is selected from the group consisting of polystyrene, poly(a-methylstyrene), poly(p-methylstyrene), poly(p-chlorostyrene), polyidene, and polyacenaphtylene.

24. The method as set forth in claim 18, wherein the step of effecting living polymerization of the styrenic monomer is continued until the resultant polystyrenic cations reach a molecular weight of from about 1,000 to about 15,000 grams/mole, and the step of effecting the living polymerization of the isobutylene monomer continues until the resultant polyisobutylene moiety reaches a molecular weight of from about 1,000 to about 50,000 grams/mole.

25. The method as set forth in claim 19, wherein the step of effecting the living polymerization of the isobutylene monomer continues until the resultant polyisobutylene moiety reaches a molecular weight of from about 1,000 to about 50,000 grams/mole and the step of effecting living polymerization of the styrenic monomer is continued until the resultant polystyrenic moiety reaches a molecular weight of from about 1,000 to about 15,000 grams/mole, and the step of.

* * * * *